United States Patent [19]

Gulistan

[11] Patent Number: 4,963,063
[45] Date of Patent: Oct. 16, 1990

[54] CAPTIVE PANEL FASTENER

[76] Inventor: Bulent Gulistan, 20568 Pinnacle Way, Malibu, Calif. 90265

[21] Appl. No.: 433,573

[22] Filed: Nov. 7, 1989

Related U.S. Application Data

[63] Continuation-in-part of Ser. No. 139,628, Dec. 27, 1987, abandoned.

[51] Int. Cl.$^5$ .................. F16B 39/00; F16B 21/18; B21K 1/44; B21K 1/58
[52] U.S. Cl. ..................... 411/105; 411/113; 411/353; 403/406.1; 10/27 R
[58] Field of Search ............... 411/103, 105, 107, 112, 411/113, 352, 353, 533, 999; 29/437, 512, 523; 403/406.1, 407.1; 10/27 R

[56] References Cited

U.S. PATENT DOCUMENTS

| | | | |
|---|---|---|---|
| 2,577,654 | 12/1951 | Gates | 29/512 |
| 3,294,140 | 12/1966 | Cosenza | 411/105 |
| 3,571,904 | 3/1971 | Gulistan | 29/512 |
| 3,995,675 | 12/1976 | Cosenza | 411/353 |
| 4,069,855 | 1/1978 | Petroshanoff | 411/105 |
| 4,119,131 | 10/1978 | Cosenza | 411/352 |
| 4,464,090 | 8/1984 | Duran | 411/103 |
| 4,655,658 | 4/1987 | Gulistan . | |
| 4,723,881 | 2/1988 | Duran | 411/112 |
| 4,747,738 | 5/1988 | Duran . | |

FOREIGN PATENT DOCUMENTS 2157786 10/1985 United Kingdom ............... 411/353

*Primary Examiner*—Neill R. Wilson
*Attorney, Agent, or Firm*—Poms, Smith, Lande & Rose

[57] ABSTRACT

A captive panel fastener includes a head, a shank, internal threads, and external, longitudinally extending slots extending from near the head to near the shank's outer end. A washer is provided and the washer has inwardly extending prongs that fit into the longitudinally extending slots when the washer is slipped onto the fastener. The outer end of the shank, past the ends of the slots, has a thin walled portion which, after the washer is in place, is deformed with a forming tool so that the wall is pushed outward. The outwardly deformed end wall blocks the ends of the longitudinally extending slots, thereby holding the washer onto the fastener. The retaining washer captures the fastener on the panel or other surface through which the fastener has been extended. A small washer may be utilized between the outer ends of the slots and the deformed end walls to block the ends of the slots, thereby allowing the end walls to indirectly hold the larger retention washer. A retaining ring with inwardly extending tangs may be utilized to engage the shank of the fastener through the longitudinally extending slots and hold the fastener so that its outer end does not extend through the panel. The retaining ring is held in place by a thin plate that is affixed to the side of the panel or other surface through which the fastener is to be extended.

19 Claims, 3 Drawing Sheets

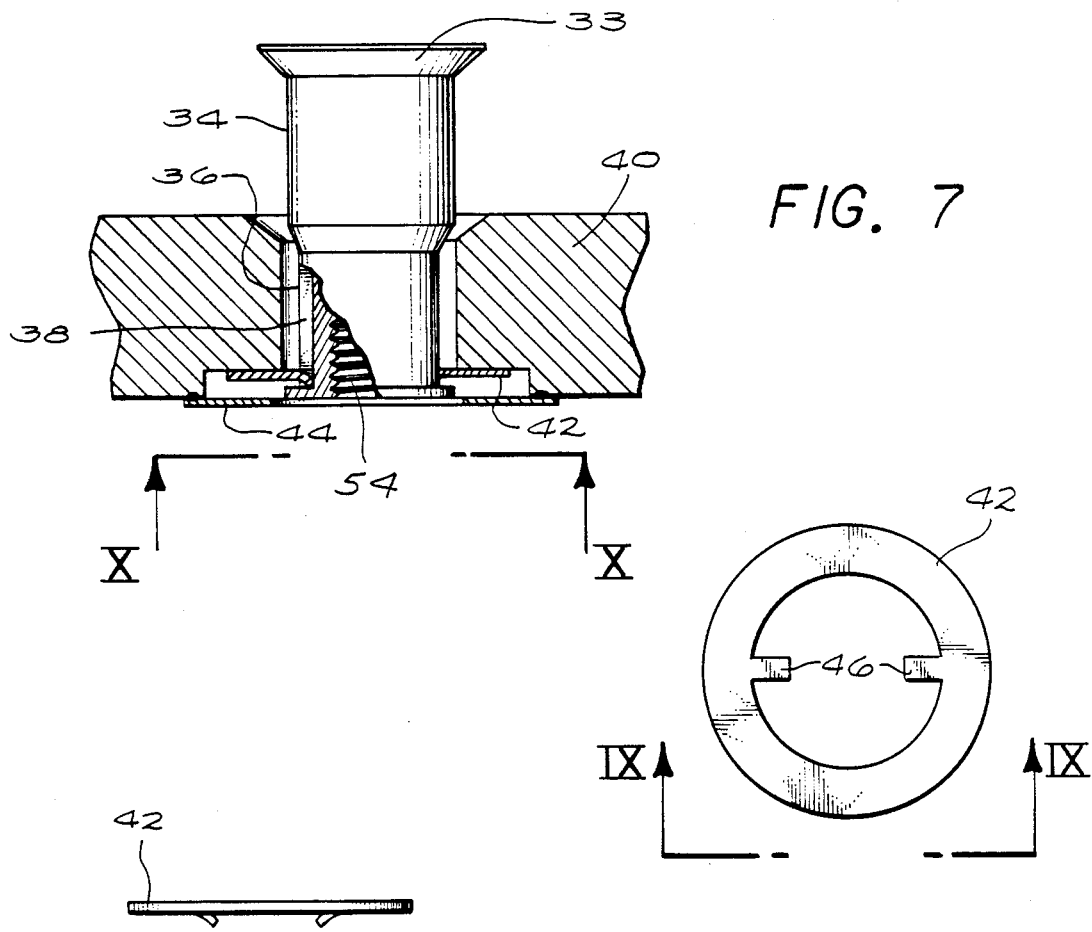
FIG. 7
FIG. 8
FIG. 9
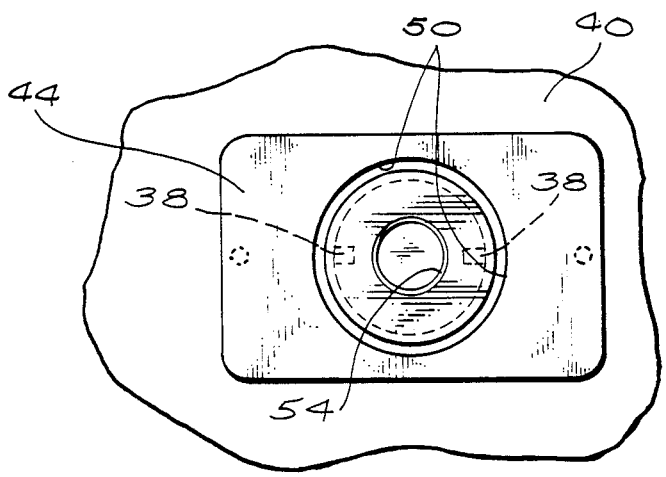
FIG. 10

CAPTIVE PANEL FASTENER

RELATED PATENTS

Continuation-in-part of application Ser. No. 139,628, filed Dec. 27, 1987 to Gulistan, now abandoned.

FIELD OF THE INVENTION

The present invention relates to captive panel fasteners, wherein the fastener is held in position extending through a hole in a panel, and secured to the panel and ready for the end of the fastener to be secured to a mating threaded member.

BACKGROUND OF THE INVENTION

Captive panel fasteners are well known in the industry. One type of fastener is arranged so that an internally threaded stud nut is held in position extending through an opening in a panel, with the internally threaded end of the stud extending through the panel. When large panels with many fasteners are used, it is important that the fasteners be properly held in position ready for the securing of their internally threaded ends to a fastener receptacle or other threaded member.

With regard to such fasteners, reference to U.S. Pat. No. 4,655,658 issued Apr. 7, 1987 to Gulistan, is useful. This patent discloses an externally threaded captive panel fastener wherein the fastener is held in position extending through a hole in a panel, by a washer. The washer has inwardly extending prongs which fit into longitudinally extending slots running through the fastener's threaded surface. The washer is retained on the fastener, and hence the fastener is retained on the panel, by an outwardly extending lip or wall at the outer end of the fastener which blocks the ends of the slots and prevents the washer from sliding off the fastener. It was originally intended that the slots of the Gulistan invention could be formed by milling or grinding. However, that proved impractical because of damages to the threads. Currently, the slots are formed by an EDM process involving the removal of material by an electrode in a special bath.

Though the EDM process is expensive, the type of EDM process used in forming the slots on the fastener described in the Gulistan patent is less expensive than the EDM process used in forming the slots on such fasteners as that described in U.S. Pat. No. 4,747,738, issued May 31, 1988 to Duran. The slots on the Gulistan fastener are less expensive to form because they extend all the way to the end (opposite of the head) of the fastener. In the Duran type fastener, the slot must end with a sharply defined wall. Forming the sharply defined wall requires a more difficult and expensive EDM process than the slots on the Gulistan fastener require.

One aspect of such externally threaded captive panel fasteners as described in Gulistan and Duran is that the outer diameter of the retaining lip is constrained to be within the root diameter of the threads so as to not interfere when the fastener is threaded into a tapped hole or the like. This constraint on the deformed end wall outer diameter imposes a relatively tight dimensional tolerance on the fasteners. This in turn requires extra care in the fabrication of such fasteners thereby increasing their cost Furthermore, the constraint on the upper limit to the outer diameter of the deformed end wall may result in a fastener whose washer retention strength is less than that which is desired.

Accordingly, an important object of the present invention is to provide a captive panel fastener that is easier and therefore less costly to produce, and which may provide greater washer retention strength.

Another aspect of the externally threaded fastener of U.S. Pat. No. 4,655,658 is that the forming tool for outwardly deforming the end wall of the fastener includes two components, one of which operates from within the opening in the end of the fastener, while the other is threaded to the fastener's external threads. However, in the case of an internally threaded fastener, it would appear, from an initial consideration of the geometry involved, that it would not be practical to deform the end wall outwardly, since the threaded portion of the tool would be in engagement with the fastener's internal threads thereby occupying the space needed to operate the portion of the tool used to deform the end wall. Accordingly, another object of the present invention involves overcoming this apparent problem.

Additionally, a further aspect of captive panel fasteners is that, when in the captured position but prior to being joined to an appropriate joining member, the captive fasteners ordinarily extend through and protrude from the panel or other surface in which they are captured. This geometry may result in assembly and alignment problems when the panel or other surface to which attachment is to be made is large or unusually shaped or curved.

Accordingly, a further object of the present invention is to provide a captive panel fastener which, when in the captured position but prior to being joined to an appropriate joining member, is prevented from protruding outward from the panel or other surface in which it is captured.

SUMMARY OF THE INVENTION

In accordance with the present invention, instead of using an externally threaded fastener with a sharp limit on the size of the formable end wall means at the end of the fastener, a different configuration is employed.

Specifically, the present invention pertains to an internally threaded captive panel fastener with a formable end wall or retaining lip at the outer end of the fastener and external, longitudinally extending slots (inexpensively formed by broaching) running to near the outer end of the fastener and terminating where the deformable end walls begin. The end walls may be formed and bent outwardly to close the ends of the slots after a retaining washer with inwardly directed prongs is inserted into the slots to hold the fastener to the panel through which it extends. Since this fastener is internally threaded, the outward deformation of the end walls may be made with the outer diameter of the deformed end wall not having any strict limitations, as is the case of externally threaded fasteners.

Furthermore, since the use of internal threads eliminates the need to limit the outer diameter of the deformed end walls from exceeding the root diameter of external threads, a larger diameter may be employed on such deformed end walls. The present invention will therefore permit greater washer retention strength than was heretofore possible with other types of captive panel fasteners. Also, less care is needed in forming the slots and they may be formed by an inexpensive broaching process.

Concerning another facet of the invention, a hand tool may be provided for forming the deformable end wall means at the outer end of the captive panel fastener. This tool might include a short threaded male portion at its forward end which is threaded into the fastener after the retaining washer is in place; a shaft extending from the center of the threaded male member with a diameter somewhat less than that of the short threaded male portion; and a longitudinally movable cylindrical forming member surrounding the shaft which may be advanced to the outer end of the fastener to deform the formable end wall means.

With regard to another aspect of the invention, the outer end of the fastener may have a cylindrical configuration between the deformable end wall means and the ends of the longitudinally extending slots and with an outer diameter somewhat less than the distance between the bottom of two opposed slots. A small washer may fit tightly over the cylindrical configuration after insertion of the retention washer and prior to end wall deformation. The small washer provides a continuous peripheral surface blocking the ends of the slots and thereby positively holding the prongs of the retention washer in place after the end walls have been deformed. With regard to this aspect of the invention, there is no intrinsic limit on the outer diameter of the small washer, as would be the case on an externally threaded captive panel fastener.

It is expected that, through the use of an internally threaded design, a less expensive captive panel fastener, with a greater washer retention strength, may be realized.

With regard to yet another aspect of the invention, a captive panel fastener is provided with external longitudinally extending slots running from the fastener's head to its outer end. The fastener is also provided with a retaining ring or washer having slightly flexible inwardly extending tangs, with the distance between two opposed tangs just slightly less than the distance between the bottoms of two opposed slots. The retaining ring may be slipped onto the end of the fastener with its tangs inserted into the external slots of the fastener. The tangs engage the bottom of the slots and apply pressure to the fastener sufficient to hold the fastener in a fixed position relative to the retaining ring; and the retaining ring or washer is prevented from disassembly from the fastener by an outwardly extending lip or wall, as discussed above. The fastener is also provided with a thin plate having a central hole having a diameter less than that of the retaining washer or ring, but greater than the diameter of the end of the fastener. The thin plate is affixed to the panel in which the fastener is positioned and is located on the side of the panel through which the outer end of the fastener is intended to extend. The thin plate holds the retaining ring in place and thereby indirectly holds the fastener in place. In this way the fastener may be captured in the panel without the need for the outer end actually protruding outward from the panel. It is believed that this configuration will eliminate assembly and alignment problems when fasteners are captured in panels which are to be joined with large or unusually shaped or curved parts.

Concerning advantages of the present invention, locating the threads internally and the slots externally, permits the removal of metal to form the slots by broaching or other machining or similar steps involving the mechanical removal of material. Forming these slots in this manner provides at least the following advantages as compared with the prior art Duran patent, or applicant's prior patent:

1. The part of the present invention may be manufactured more rapidly.
2. The resultant fastener is stronger, as a result of cold working, than the EDM parts which are weakened by the heat generated in the course of the EDM process.
3. The cost of the new fastener is about one-half that of comparable prior fasteners.

Other objects, features and advantages of the invention will become apparent from a consideration of the following detailed description and from the accompanying drawings.

BRIEF DESCRIPTION OF THE DRAWINGS

FIG. 7 is a cross-sectional view of a captive panel fastener showing an alternative embodiment of the invention using a retaining ring with slightly flexible tangs and a shim with a central hole;

FIG. 8 is a plan view of a retaining ring with inwardly extending tangs;

FIG. 9 is a side elevation edge view of a retaining ring taken along line IX—IX of FIG. 8; and FIG. 10 is a plan view of a thin plate with a central hole taken along line X—X of FIG. 7.

DETAILED DESCRIPTION

Figure 1:
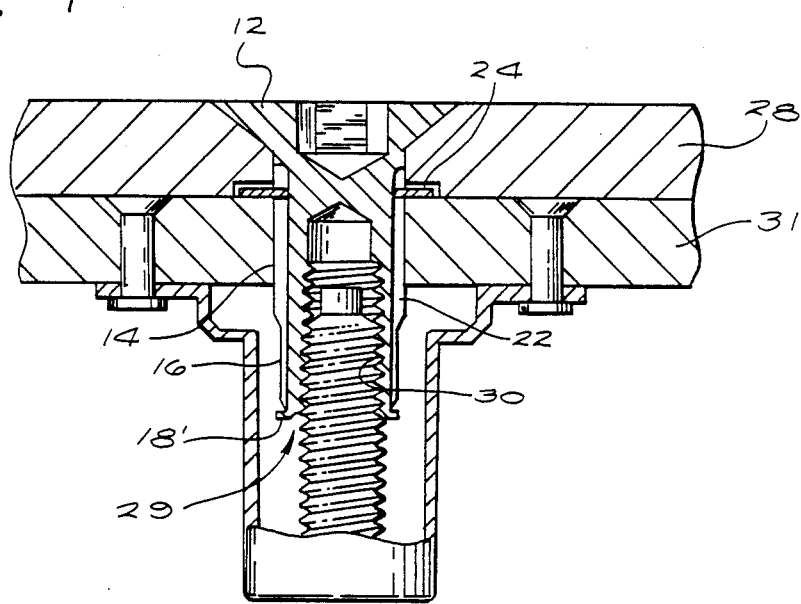
FIG. 1 is a cross-sectional view through an internally threaded fastener, retaining washer and fastener receptacle which illustrates the principles of the present invention.

Referring more particularly to the drawings, FIG. 1 shows a captive panel fastener illustrating the principles of the present invention. The fastener of FIG. 1 has a head 12 and a shank with a large diameter portion 14 and a small diameter portion 16. The fastener is also provided with a plurality of longitudinally extending slots 22 which run from close to the head to close to the outer end of the fastener. The fastener also includes internal threads 30. The fastener extends through panel 28 and is provided with retaining washer 24 which would hold the fastener onto panel 28 even prior to assembly with screw assembly 29, which holds panel 31 to panel 28.

Figure 2:
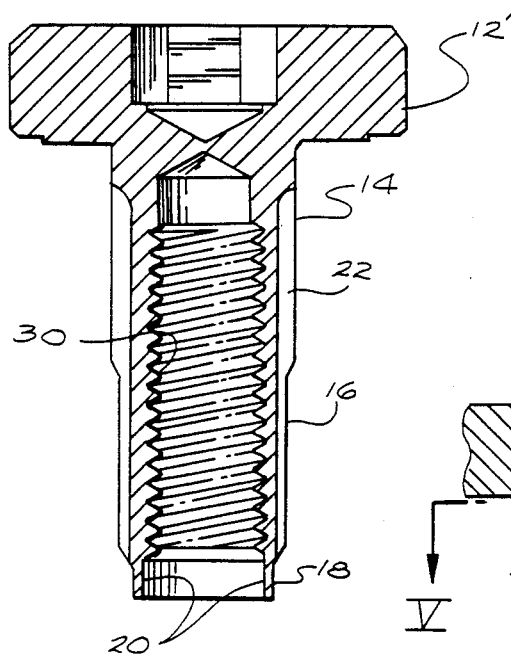
FIG. 2 is a cross-sectional view of an internally threaded fastener prior to end wall deformation.
Figure 3:
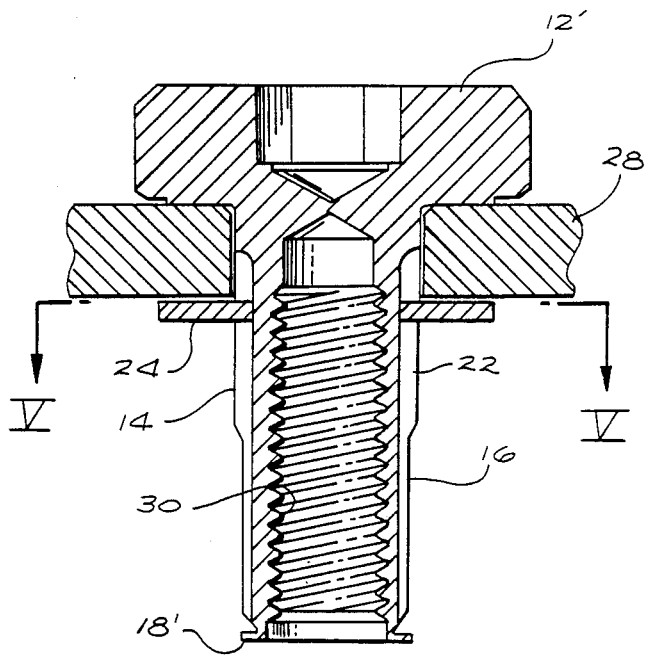
FIG. 3 is a cross-sectional view of an internally threaded fastener and retaining washer subsequent to end wall deformation.
Figure 4:
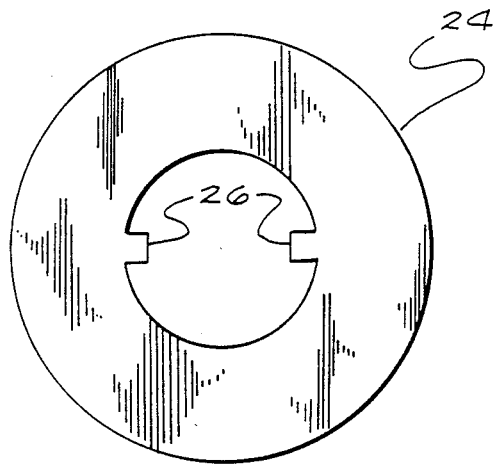
FIG. 4 is a plan view of a washer and its inwardly extending prongs which may be employed in the implementation of the present invention.
Figure 5:
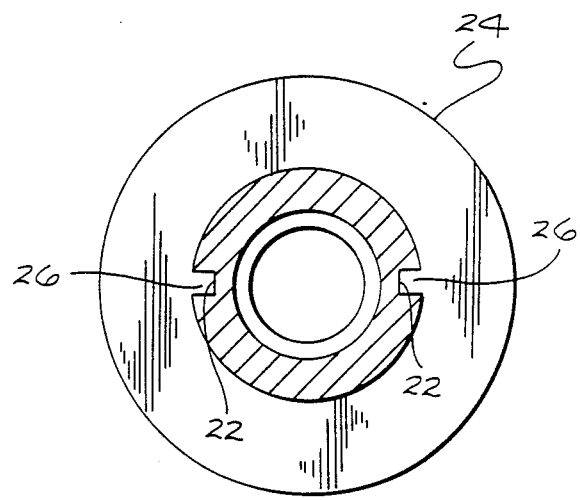
FIG. 5 is a cross-sectional view of a fastener and retaining washer taken along lines V—V of FIG. 3.

As is best illustrated in FIG. 2, at the outer end of the fastener just beyond the ends of slots 22 is a thin walled portion 18 of the fastener. Initially, this thin walled portion has an outer diameter which is equal to or slightly less than twice the distance from the center of the fastener to the bottom of the slots 22. After mounting the fastener through the panel 28 and mounting the retaining washer 24 with its substantially rigid inwardly extending prongs 26 (see FIGS. 4 and 5) inserted into the slots 22, the thin walled portion 18 is deformed. The deformation consists of bending the thin walled portion of the fastener outwardly to the position shown at 18' (see FIG. 3) whereupon it blocks the outer ends of slots 22, either directly or indirectly, thereby preventing the retaining washer 24 from sliding off the fastener. FIG. 3 is a cross-sectional view of the internally threaded fastener showing a fastener (with an alternative head configuration 12') extending through the panel 28 with the retaining washer 24 in place and the end wall 18' deformed.

The slots 22 may be formed by an inexpensive broaching process. A more exact and expensive technique such as EDM, which is typically used on externally threaded fasteners, is not needed. The present internal threads are not affected by the formation of the slots. Furthermore, the slots do not require a sharply defined end wall as is required in the fastener of the Duran patent cited above, because the deformed thin walled portion 18' restrains the retaining washer 24 (see FIG. 3).

Note that the outer diameter of the portion of the shank nearest the head may be of a relatively large diameter, up to slightly less than the outer diameter of the retaining washer, so as to provide additional strength to the fastener and to provide a tight fit in the panel 28.

Also, in contrast to other types of fasteners which do not use an internal thread configuration, the outer diameter of the deformed end walls 18, is not limited to the root diameter of threads, as would be the case in an externally threaded fastener.

Figure 6:
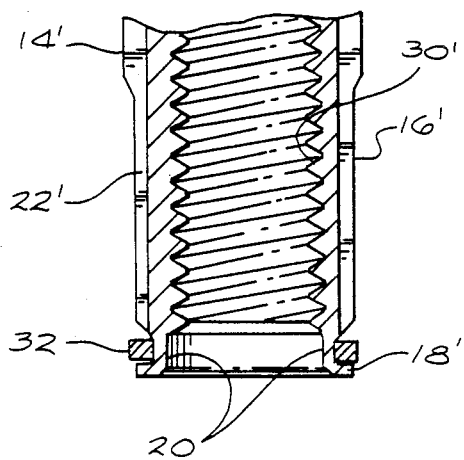
FIG. 6 is a partial cross-sectional view of the outer end of an internally threaded fastener showing an alternative embodiment of the invention using a small supplemental washer.

FIG. 6 illustrates an alternative embodiment for the outer end of the fastener of FIGS. 1, 2 and 3. In this alternative embodiment, all features of the fastener away from the outer end are substantially as shown in FIGS. 1, 2 and 3. However, in the FIG. 6 embodiment, after the retaining washer 24 is inserted over the end of the fastener and into the slots 22', a small washer 32 is slid onto the end of the fastener up to the outer ends of slots 22, thereby blocking the outer ends of the slots, and the thin walled portion of the outer end 18 of the fastener is deformed outwardly as shown at reference numeral 18' to hold the small washer 32 in place. Thus, the outwardly deformed thin walled portion 18' of the fastener indirectly blocks the ends of the slots 22' by holding the small washer 32 in position. It is noted that the outer diameter of small washer 32 and the deformed thin walled portion of the fastener 18' have no intrinsic limits on them as would be the case for an externally threaded fastener where the outer diameters would be limited by the root diameter of the threads so as to not interfere with the threading of the fastener into a tapped hole.

FIG. 7 illustrates another embodiment of a captive panel fastener. In the FIG. 7 embodiment, the fastener has a head 33 and a shank with a large diameter portion 34 and a small diameter portion 36. The fastener is provided with a plurality of longitudinally extending slots 38 which run from close to the head to the outer end of the fastener.

The fastener is positioned in panel 40 and is held in place on the panel by retaining ring 42 and thin plate 44. As is illustrated in FIG. 8, the retaining ring 42 has a plurality of inwardly extending slightly flexible prongs or tangs 46. Initially these tangs 46 are in a plane, and the opposing tangs are separated by a distance slightly less than the distance between the bottoms of opposing slots 38. When the retaining ring is slipped onto the end of the fastener, the tangs 46 are inserted into the slots 38 and resiliently engage the bottom of the slots. The flexible tangs give slightly and at the same time exert pressure on the bottoms of the slots to grip the fastener and hold it in a fixed position relative to the retaining ring. FIG. 9 illustrates the position of the retaining ring's slightly flexible tangs after insertion onto the fastener's end. If desired, the tangs may be pre-bent to more precisely apply the desired measure.

As can be seen in FIG. 7, the plate 44 is affixed to that surface of panel 40 through which the outer end of the fastener is to be extended. As is illustrated in FIG. 10, the plate 44 has a central hole 50 with a diameter that is at least as large as the outer diameter of the outer end of the fastener but less than the outer diameter of retaining ring 42. The plate 44 is affixed to panel 40 so that the vertical axis of its central hole is coaxial with the vertical axis of the fastener. When affixed, the plate 44 engages the retaining ring 42 whereupon the plate 44 holds in position both the retaining ring 42 and the fastener being gripped by the tangs 46 of the retaining ring.

It is noted that in the preferred embodiment illustrated in FIG. 7 the fastener is held in position with no portion of its outer end extending through the panel. This configuration eliminates assembly and alignment problems when fasteners are captured in panels which are to be joined with large or unusually shaped or curved parts.

It is also noted that this embodiment of a captive panel fastener is equally applicable to both internally and externally threaded fasteners, such as those shown in FIGS. 1 through 7 hereof, and in my prior patent cited hereinabove. However, the fastener employed in the assembly of FIGS. 7-10 is similar to that of FIG. 1, in that it is internally threaded, as indicated at reference numeral 54 in FIG. 10, and the outer end wall 56 has been deformed outwardly as shown in FIGS. 1 and 3 to hold the retaining ring 42 on the fastener.

In conclusion, it is to be understood that the above detailed description and accompanying drawings relate to preferred embodiments of the invention. Other embodiments may be utilized without departing from the scope of the invention. Thus, by way of example and not of limitation, various head configurations may be used, the fasteners may have two, three, or four slots, and any desired materials normally and for fasteners may be employed. Accordingly, it is to be further understood that the detailed description and drawings set forth hereinabove are for illustrative purposes only and do not constitute a limitation on the scope of the invention.

What is claimed is:

1. An inexpensive, high strength, captive, panel fastener assembly comprising:
 a fastener having a head, a shank and an internally threaded outer end;
 said shank, including said internally threaded outer end, having a plurality of external longitudinally extending slots;
 a substantially rigid inflexible retention washer having inwardly extending prong means for fitting into said external longitudinally extending slots;
 formable end wall means at the outer end of said fastener for blocking the outer ends of said slots and retaining said washer onto said fastener by preventing said washer prongs from sliding off the end of the fastener, and thereby holding the fastener captive in the desired location, said formable end wall means being formed of the same material as, and being integral with the remainder of said fastener; and the outer diameter of said formable end wall means being equal to or slightly less than the smallest outer diameter of the shank on said fastener.

2. An inexpensive, high strength, captive, panel fastener assembly as defined in claim 1 wherein said shank has an outer diameter near said head that is greater than its outer diameter near said outer end.

3. An inexpensive, high strength, captive, panel fastener assembly as defined in claim 1 wherein said fastener has only two slots and wherein said washer has two corresponding inwardly extending prongs.

4. An inexpensive, high strength, captive, panel fastener assembly as defined in claim 1 wherein said end wall means has an initial outer diameter which is slightly less than the distance between the bottoms of two opposed slots, whereby said washer may readily slide over the end of the fastener into said slots, prior to deformation of said end wall means.

5. An inexpensive, high strength, captive, panel fastener assembly as defined in claim 4 wherein said slots have one end near said head, extend along said shank, and have an open end at the outer end of said shank, whereby said slots may be inexpensively formed by broaching or a similar inexpensive process.

6. An inexpensive, high strength, captive, panel fastener assembly as defined in claim 1 wherein the outer diameter of said formable end wall means, after deformation, is equal to or slightly less than the smallest outer diameter of the shank on said fastener.

7. An inexpensive, high strength, captive, panel fastener assembly as defined in claim 1 further comprising a small washer means having an outer diameter extending beyond the bottom of said slots, said small washer being mounted on the outer end of said fastener between the ends of said slots and said formable end wall means, whereby said formable end wall means blocks the ends of said slots indirectly by holding said small washer in place.

8. An inexpensive, high strength, captive, panel fastener assembly comprising:
   a fastener having a head, a shank and an outer end;
   said shank, including said outer end, having a plurality of external longitudinally extending slots;
   a retention washer having inwardly extending slightly flexible tangs for fitting into said external longitudinally extending slots and engaging said slots; and
   a thin flat plate for attachment to the panel into which said fastener is to be positioned, said plate having a hole having a diameter greater than the outer end and shank of said fastener, and less than the diameter of said retention washer.

9. An inexpensive, high strength, captive, panel fastener assembly as defined in claim 8 wherein said retaining ring has only two inwardly extending slightly flexible tangs and said fastener has two corresponding longitudinal slots.

10. An inexpensive, high strength, captive, panel fastener assembly as defined in claim 8 wherein said shank is externally threaded.

11. An inexpensive, high strength, captive, panel fastener assembly as defined in claim 8 wherein said shank is internally threaded.

12. An inexpensive, high strength, captive, panel fastener assembly as defined in claim 8 wherein said shank has an outer diameter near said head that is greater than its outer diameter near said outer end.

13. An inexpensive, high strength, captive, panel fastener assembly as defined in claim 11 wherein said shank has an outer diameter near said head that is greater than its outer diameter near said outer end.

14. An inexpensive, high strength, captive, panel fastener assembly comprising:
   a fastener having a head, a shank and an internally threaded outer end;
   said shank, including said internally threaded outer end, having a plurality of external longitudinally extending slots formed by broaching;
   a retention washer having inwardly extending prong means for fitting into said external longitudinally extending slots;
   formable end wall means at the outer end of said fastener for blocking the outer ends of said slots and retaining said washer onto said fastener by preventing said washer prongs from sliding off the end of the fastener, and thereby holding the fastener captive in the desired location, said formable end wall means being formed of the same material as, and being integral with, the remainder of said fastener; and
   said end wall means having an initial outer diameter which is no greater than the distance between the bottoms of two opposed slots, whereby said washer may readily slide over the end of the fastener into said slots, prior to deformation of said end wall means.

15. An inexpensive, high strength, captive, panel fastener assembly comprising:
   a fastener having a head, a shank and an internally threaded outer end;
   said shank, including said internally threaded outer end, having a plurality of external longitudinally extending slots formed by the mechanical removal of material;
   a retention washer having inwardly extending prong means for fitting into said external longitudinally extending slots;
   formable end wall means at the outer end of said fastener for blocking the outer ends of said slots and retaining said washer onto said fastener by preventing said washer prongs from sliding off the end of the fastener, and thereby holding the fastener captive in the desired location, said formable end wall means being formed of the same material as, and being integral with, the remainder of said fastener; and
   a small washer means having an outer diameter extending beyond the bottom of said slots, said small washer being mounted on the outer end of said fastener between the ends of said slots and said formable end wall means, whereby said formable end wall means blocks the ends of said slots indirectly by holding said small washer in place.

16. An inexpensive, high strength, captive, panel fastener assembly comprising:
   a fastener having a head, a shank and an internally threaded outer end;
   said shank, including said internally threaded outer end, having a plurality of external longitudinally extending slots; a substantially rigid inflexible retention washer having inwardly extending prong means for fitting into said external longitudinally extending slots;

formable end wall means at the outer end of said fastener for blocking the outer ends of said slots and retaining said washer onto said fastener by preventing said washer prongs from sliding off the end of the fastener, and thereby holding the fastener by preventing said washer prongs from sliding off the end of the fastener, and thereby holding the fastener captive in the desired location, said formable end wall means being formed of the same material as, and being integral with the remainder of said fastener;

said retention washer means being flexible, wherein said prong means make resilient engagement with said fastener; and means for holding said retention washer but not said fastener to a panel into which said fastener is to be secured.

17. A method for providing a captive, panel fastener held in place comprising the steps of:

fabricating a fastener having a head, a shank and an internally threaded outer end, said shank, including said internally threaded outer end having a plurality of external longitudinally extending slots, and said outer end having a central opening and a short unthreaded portion constituting a formable wall at the end of the fastener;

mounting said fastener in the desired captive location;

sliding a retention washer having a plurality of inwardly extending prongs to fit closely into said slots with said washer extending around said fastener;

deforming the formable end wall outwardly to block the outer ends of said slots to hold said retention washer onto said fastener by preventing said washer prongs from sliding off the end of the fastener and thereby holding the fastener in the desired location;

engaging said prongs with the inside of said slots; and locating said retention washer at the end of said fastener and adjacent the panel, and restraining said washer from movement from this location.

18. A method for providing a captive, panel fastener held in place comprising the steps of:

fabricating a fastener having a head, a shank and an internally threaded outer end, said shank, including said internally threaded outer end having a plurality of external longitudinally extending slots, and said outer end having a central opening and a short unthreaded portion constituting a formable wall at the end of the fastener;

mounting said fastener in the desired captive location;

sliding a retention washer having a plurality of inwardly extending prongs to fit closely into said slots with said washer extending around said fastener;

deforming the formable end wall outwardly to block the outer ends of said slots to hold said retention washer onto said fastener by preventing said washer prongs from sliding off the end of the fastener and thereby holding the fastener in the desired location; and deforming said formable end wall outwardly such that said formable end wall, after deformation, is equal to or slightly less than the smallest outer diameter of the shank on said fastener.

19. A method as defined in claim 18 wherein said slots are formed by broaching or a similar inexpensive process.

* * * * *